United States Patent [19]

Suzuki

[11] Patent Number: 4,750,007

[45] Date of Patent: Jun. 7, 1988

[54] INK SHEET CASSETTE AND IMAGE RECORDING APPARATUS USING THE SAME

[75] Inventor: Takayuki Suzuki, Saitama, Japan

[73] Assignee: Canon Kabushiki Kaisha, Tokyo, Japan

[21] Appl. No.: 891,663

[22] Filed: Aug. 1, 1986

[30] Foreign Application Priority Data

Aug. 6, 1985 [JP] Japan .......................... 60-120714[U]
Dec. 24, 1985 [JP] Japan .......................... 60-289231
Jan. 10, 1986 [JP] Japan .......................... 61-1201[U]

[51] Int. Cl.⁴ .......................... G01D 15/10; B41J 3/20

[52] U.S. Cl. .......................... 346/76 PH; 400/120; 400/207; 400/248; 346/136

[58] Field of Search .......................... 346/136, 76 PH; 400/248–249, 207, 120

[56] References Cited

U.S. PATENT DOCUMENTS 3,974,906 8/1976 Lee et al. .......................... 400/196.1
4,280,767 7/1981 Heath .......................... 400/216.2
4,407,593 10/1983 Haftmann .......................... 400/208
4,428,695 1/1984 Jamieson .......................... 400/249

FOREIGN PATENT DOCUMENTS 56-69187 6/1981 Japan .
56-162682 12/1981 Japan .
173358 11/1985 Japan .
144377 7/1986 Japan .

*Primary Examiner*—Clifford C. Shaw
*Assistant Examiner*—Gerald E. Preston
*Attorney, Agent, or Firm*—Fitzpatrick, Cella, Harper & Scinto

[57] ABSTRACT

The present invention relates to an ink sheet cassette which can change the path of an ink sheet from one to another depending on the properties of the ink sheet, that is, can vary a timing or angle at which the ink sheet is separated from a recording medium after being recorded such that an image can be recorded depending on the properties of the ink sheet, and an image recording apparatus using such an ink sheet cassette.

More specifically, the present invention provides an ink sheet cassette removably mounted in a recording apparatus for using an ink sheet to print on a recording medium, the cassette including an ink sheet supply portion supporting an ink sheet to be supplied, an ink sheet wind-up portion for winding the ink sheet from the ink sheet supply portion after the ink sheet has been moved past a recording position at which a recording operation is carried out, a drive power receiving portion for receiving drive power causing the ink sheet wind-up portion to wind the ink sheet, a device for defining the path of the ink sheet, the defining device being located at a position downstream of the recording position in a direction in which the ink sheet is moved from the ink sheet supply portion to the ink sheet wind-up portion, and a device for shifting the defining device to change the path of ink sheet from one to another.

67 Claims, 11 Drawing Sheets

INK SHEET CASSETTE AND IMAGE RECORDING APPARATUS USING THE SAME

BACKGROUND OF THE INVENTION

1. Field of the Invention

The present invention relates to an ink sheet cassette capable of changing paths of an ink sheet from one to another to record a desired image depending on the property of the ink sheet. The present invention also concerns an image recording apparatus using such an ink sheet cassette.

The image recording apparatus described herein includes printers, word processors, typewriters, facsimiles and so on. The ink sheet described herein includes various types of ink sheets such as a ribbon-like ink sheet having a relatively small width which can be used in the so-called serial type recording system and an ink sheet having substantially the same width as that of a recording sheet used, which can be used in the so-called full-line type recording system. Ink sheets used in the present invention may have different properties.

2. Related Background Art

Recently, the thermal transfer type of recording system has been developed and it is currently used as an information processing system. The thermal transfer type of recording system generally uses a thermal transfer medium comprising a ribbon-like substrate and a thermally transferable ink applied to the substrate, the ink including a colorant which is dispersed in a hot-melt binder. The thermal transfer medium is superposed on a recording sheet with the thermally transferable ink layer thereof contacting the recording sheet. Heat is then applied to the thermal transfer medium from a thermal head through the substrate to fuse the ink. The fused ink is transferred to the recording sheet to form an image corresponding to the configuration of heat transfer on the recording sheet. The thermal transfer type recording system can use paper as the recording sheet while maintaining advantages in the heat sensitive recording process. It also can eliminate problems associated with the use of heat sensitive recording sheets.

However, the thermal transfer type recording method has some problems with respect to its properties of transfer. For example, the quality of print is highly influenced by the smoothness of the surface of the recording sheet used. If a recording sheet having a smoother surface is used, the quality of print is increased. If not so, the quality of print is very much degraded. The most typical recording sheet is conventional paper rather than the special paper having increased smoothness of surface. The conventional paper has irregularities ranging through various degrees since it is made of interlocking fibers. Thus, fused ink cannot penetrate into the fibers of the paper and is deposited only on or near the raised portions of the surface. The resulting image would have dull edges or incomplete parts. In order to improve the quality of print, a hotmelt binder having a lower melting point may be used. However, it may be disadvantageous in that the thermally transferable ink layer is adhesive even at relatively low temperatures, resulting in degradation of the shelf stability and contamination of unprinted sheet parts.

In the thermal transfer type recording process, the thermal transfer medium is in contact with the recording sheet under pressure from a recording head. The thermal transfer medium is separated from the recording sheet at the end of the recording head. The time required to separate the thermal transfer medium from the recording sheet after the ink layer is thermally applied to the recording sheet is very short. Therefore, the thermal transfer medium must be separated from the recording sheet before the fused ink is solidified. As a result, the ink would not fully be transferred to the recording sheet.

SUMMARY OF THE INVENTION

It is therefore an object of the present invention to provide an ink sheet cassette capable of recording images depending on the property of ink sheet used and an image recording apparatus using such an ink sheet cassette.

Another object of the present invention is to provide an ink sheet cassette capable of desirably recording images even on recording sheets having decreased smoothnesses (called "rough sheets") and an image recording apparatus using such an ink sheet cassette.

Still another object of the present invention is to provide an ink sheet cassette capable of improving the quality of image and an image recording apparatus using such an ink sheet cassette.

A further object is to provide an ink sheet cassette capable of varying the time required to separate an ink sheet from a recording sheet after the ink sheet initially contacts the recording sheet and an image recording apparatus using such an ink sheet cassette.

A further object is to provide an ink sheet cassette capable of varying an angle between an ink sheet and a recording sheet at which the ink sheet is separated from the recording sheet and an image recording apparatus using such an ink sheet cassette.

A further object is to provide an ink sheet cassette capable of varying paths of an ink sheet from one to another and an image recording apparatus using such an ink sheet cassette.

DESCRIPTION OF THE PREFERRED EMBODIMENTS

The present invention will now be described in detail in connection with its preferred embodiments.

Figure 1:
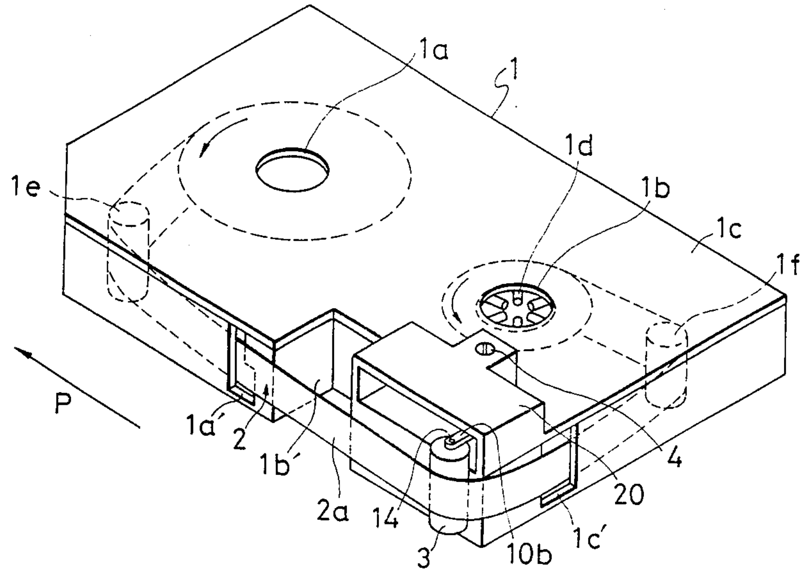
FIG. 1 is a perspective view of an ink ribbon cassette which is one embodiment of the present invention.
Figure 2:
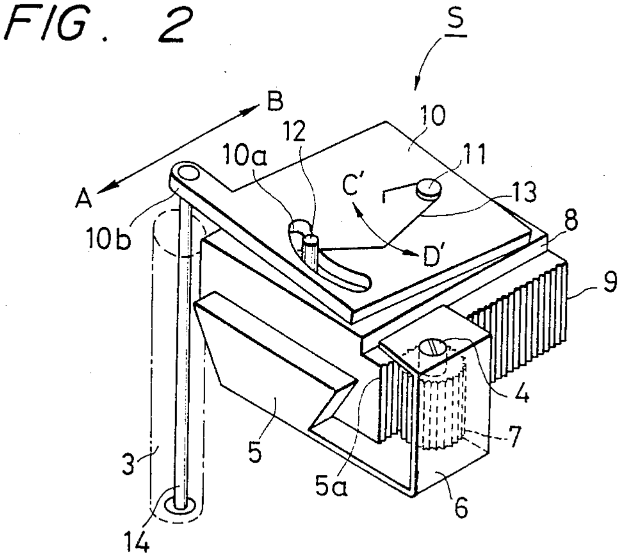
FIG. 2 is a perspective view of the roller supporting mechanism shown in FIG. 1.
Figure 3A:
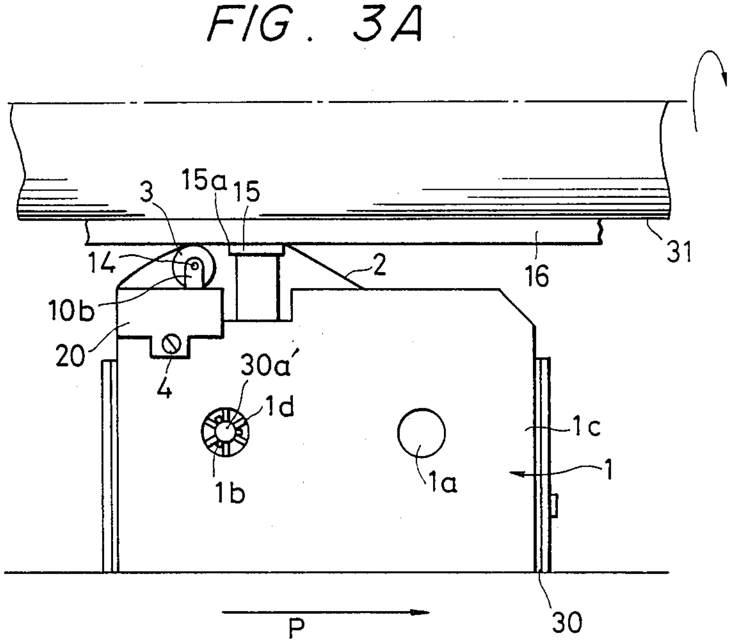
FIGS. 3A and 3B illustrate different operational positions of the ink ribbon cassette shown in FIG. 1.
Figure 3B:
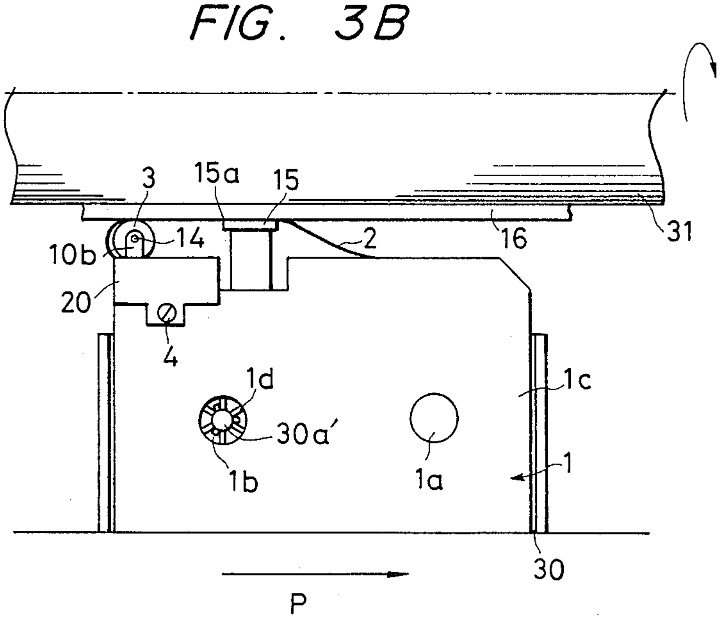

FIG. 1 is a perspective view of an ink ribbon cassette which is one embodiment of the present invention; FIG. 2 is a perspective view of a roller supporting mechanism; and FIGS. 3A and 3B illustrate different operations of the ink ribbon cassette.

Each of the embodiments as will be described is an ink ribbon cassette removably mounted on a thermal transfer type recording apparatus C which will be described with reference to FIGS. 4 and 5. The cassette houses a length of ink ribbon adapted to be pressed against a recording sheet by means of a thermal head. The ink ribbon is heated by the thermal head with the ink thereon transferred to the recording sheet. Such a cassette includes an abutment member for pressing the just heated part of the ink ribbon against the recording sheet, the operational position of the abutment member being adjustable in the direction of the moving ribbon.

When the just heated part of the ink ribbon is pressed against the recording sheet by means of the abutment member, a timing at which this part of the ink ribbon is separated from the recording sheet is delayed to prolong the period of time between the heating and separating steps. As such period of time is increased, the aggregation of the transferred ink is correspondingly increased such that the desired amount of ink can fully be transferred to the recording sheet.

Said timing can optimally be adjusted by adjusting the position of the abutment member, for example, dependent on the properties of the ink ribbon such as the aggregation of the ink layer or the properties of the recording sheet such as the smoothness of surface. Even if a recording sheet having a reduced smoothness of surface is used, the transfer of ink may be effected very well.

Referring now to FIG. 1, there is shown an ink ribbon cassette 1 which is removably mounted on a carriage for moving a printing head (thermal head) on the thermal transfer type recording apparatus C. The cassette 1 houses the aforementioned thermal transfer type ink ribbon 2 which is wound around supply and wind-up reels 1*a* and 1*b* within the cassette 1.

The cassette 1 includes a housing 1*c* having an ribbon outlet 1*a*′ formed thereon at the forward and central portion opposed to the recording sheet when the cassette 1 is mounted in the recording apparatus. The housing 1*c* also has recesses 1*b*′ formed thereon adjacent to the ribbon outlet 1*a*′ and adapted to loosely receive the printing head when the cassette 1 is mounted in the recording apparatus. The housing 1*c* further includes a ribbon inlet 1*c*′ formed on one of the side faces and adjacent to the front face. The wind-up reel 1*b* includes a gear rigidly mounted therein for receiving a driving force from the recording apparatus C to rotate the wind-up reel 1*b* in the direction of ribbon winding.

A portion of the ink ribbon 2 is externally exposed on the housing 1*c* between the outlet and inlet 1*a*′, 1*c*′. The exposed portion of the ink ribbon 2 is tensioned to a predetermined level and used in printing. On printing, the ink ribbon is moved by the gear 1*d* and a drive mechanism which will be described, in a direction opposite to the direction of print shown by arrow P (the direction of movement in the carriage). Unused part of the ink ribbon 2 wound around the supply reel 1*a* is drawn out from the outlet 1*a* through a joggle 1*e* and then heated by the printing head. Thereafter, the used part of the ink ribbon 2 is moved into the cassette 1 through the inlet 1*c*′ and wound around the wind-up reel 1*b* through a joggle 1*f*.

In the illustrated embodiment, the cassette 1 further includes a roller 3 serving as means for slightly contacting or pressing the just heated part of the ink ribbon 2 against the recording sheet. The roller 3 is rotatably mounted, through a shaft 14, on the front face of the cassette 1 at a location on the downstream side of the recess 1*b*′ in the direction of ribbon movement and in contact with the ink ribbon 2, as seen from FIG. 2. The roller 3 is supported by a roller supporting mechanism S which is mounted within a roller supporting portion 20 on one front corner of the cassette 1. The position of the roller supporting mechanism S is adjustable in the direction of ribbon movement by the use of a roller shifting screw 4.

The detailed structure of the roller supporting mechanism S is illustrated in FIG. 2.

In FIG. 2, reference numeral 5 denotes a stationary member of inverted trapezoidal configuration for supporting the entire mechanism. The member 5 is rigidly mounted in the cassette 1. A gear support member 6 having a substantially transverse U-shaped configuration is rigidly mounted on the inner end 5*a* of the stationary member 5. A pinion gear 7 is rigidly mounted to rotate around the roller shifting screw 4 within the gear support member 6. When the roller shifting screw 4 is rotated by an operator using a screwdriver or the like, the pinion gear 7 can be rotated together with the screw 4.

In FIG. 2, reference numeral 8 designates a movable member of rectangular thickened plate configuration formed at its bottom with an inverted trapezoidal groove corresponding to the configuration of the stationary member 5. The movable member 8 is slidably mounted on the stationary member 5 through the dovetail connection such that the movable member 8 will be moved on the stationary member 5 in the direction shown by double-headed arrow A-B in FIG. 2. The movable member 8 is provided with a rack 9 on the side of the movable member 8 facing the pinion gear 7, the rack 9 being engaged by the pinion gear 7. Thus, by rotating the pinion gear 7 counter-clockwise or clockwise through the roller shifting screw 4, the movable member 8 can be moved in the direction A or B. The roller supporting mechanism is arranged such that the path of the movable member extends parallel to the direction of ribbon movement.

A rotary plate 10 is rotatably mounted on the movable member 8 through a pin 11 on the movable member 8 such that the rotary plate 10 can be rotated in a direction shown by double-headed arrow C'-D' in FIG. 2. The rotary plate 10 is formed with an arcuate slot 10a which loosely receives a second pin 12 on the movable member 8. The second pin 12 limits the rotation of the rotary plate 10. The rotary plate 10 further includes a pin 11 around which a spring 13 is wound with one end fastened to the rotary plate 10. The other end of the spring 13 is hooked on the pin 12. Thus, the rotary plate 10 is biased in the direction C' under the action of the spring 13.

An arm 10b is formed on the forward edge of the rotaty plate 10 at the leftward end portion thereof as viewed in FIG. 2. This arm 10b supports the shaft 14 around which the aforementioned roller 3 is rotatably mounted. The roller 3 may have any suitable diameter, but must have a length larger than the width of the ink ribbon 2 such that the latter can contact the recording sheet through the entire width of the ink ribbon 2.

The roller 3 is so arranged that it can cause the ink ribbon 2 to bring into contact with the recording sheet under the action of the spring 13 biasing the rotaty plate 10 in the direction C and that the position of the roller 3 can be adjusted in the direction of ribbon movement through the roller shifting screw 4. In such an arrangement, therefore, the roller 3 can be shifted from one position to another across the path of ink sheet so that the time required to separate the ink ribbon 2 from the recording sheet after the ink ribbon 2 has been heated by the printing head can be adjusted.

Referring next to FIGS. 3A and 3B, there is shown the aforementioned ink sheet cassette 1 mounted on a carriage 30 in the thermal transfer type recording apparatus C. In these figures, reference numeral 15 denotes a thermal head used as a recording head and which is mounted on the carriage 30. The thermal head 15 includes heating elements (not shown) energized in response to information to be printed. Reference numeral 31 designates a platen roller which can maintain a recording sheet 16 in place on energization of the thermal head 15 and which can also rotate to move the recording sheet 16.

On printing, the ink ribbon 2 is pressed against the recording sheet 16 by the thermal head 15, as shown in FIGS. 3A and 3B. At the same time, the carriage 30 is driven to move the cassette 1 in the direction of print shown by arrow P while the thermal head 15 is energized in response to the printing date. The ink ribbon 2 is moved in the opposite direction to the direction of print while receiving heat from the thermal head 15. Ink at the heated part of the ink ribbon is fused and transferred to the recording sheet 16 to form a series of printed letters.

The prior art does not provide such a member as the roller 3 in the illustrated embodiment of the present invention. Thus, the portion of the ink ribbon 2 which has just been heated by the thermal head 15 would continually be separated from the recording sheet 16 at the leftward end portion 15a of the thermal head 15 as viewed in FIGS. 3A and 3B. This provides a very reduced period of time from the heating step to the separating step. On separation, the ink is still in its fused state. Therefore, the aggregation of the ink layer is lower on the separating step and the ink cannot fully be transferred to the recording sheet. If a recording sheet having a lower smoothness of surface is used, the quality of print would be degraded.

On the contrary, the present invention utilizes the roller 3 capable of pressing the just heated part of the ink ribbon 2 against the recording sheet 16. Therefore, the ink ribbon 2 is moved in contact with the recording sheet 16 even after the ink ribbon 2 has been moved past the leftward end portion 15a of the thermal head 15. The ink ribbon 2 is first separated from the recording sheet 16 after moved past the peripheral face of the roller 3. In this embodiment, thus, a timing at which the ink ribbon 2 is separated from the recording sheet 16 after the ink ribbon 2 has been heated by the thermal head 15 can be delayed so that the aggregation of the ink layer will be increased to provide the fully transfer of ink to the recording sheet 16.

In addition, the position of the roller 3 can be adjusted in the direction of ribbon movement. Therefore, said timing can optimally be adjusted depending on different aggregations of inks and/or different smoothnesses of surface in recording sheets.

For example, if the aggregation of ink is larger or if the smoothness of sheet surface is higher, the roller 3 may be positioned at a location nearer the thermal head 15 to produce a separation of the ink ribbon from the recording sheet at an earlier time, as shown in FIG. 3A. On the contrary, if the aggregation of ink is smaller or if the smoothness of sheet surface is lower, the position of the roller 3 may be set farther the thermal head 15 can delay the separation.

As will be apparent from the foregoing, this embodiment provides an extremely simple and inexpensive structure which can provide an increased quality of print even for a recording sheet having a lower smoothness of surface. The roller 3 may be replaced by any suitable abutment member. The structure supporting the roller at its adjustable position is not limited to that shown in FIG. 2.

The construction of the thermal transfer type recording apparatus or thermal transfer printer C utilizing the aforementioned ink ribbon cassette will now be described with reference to FIG. 4.

Figure 4:
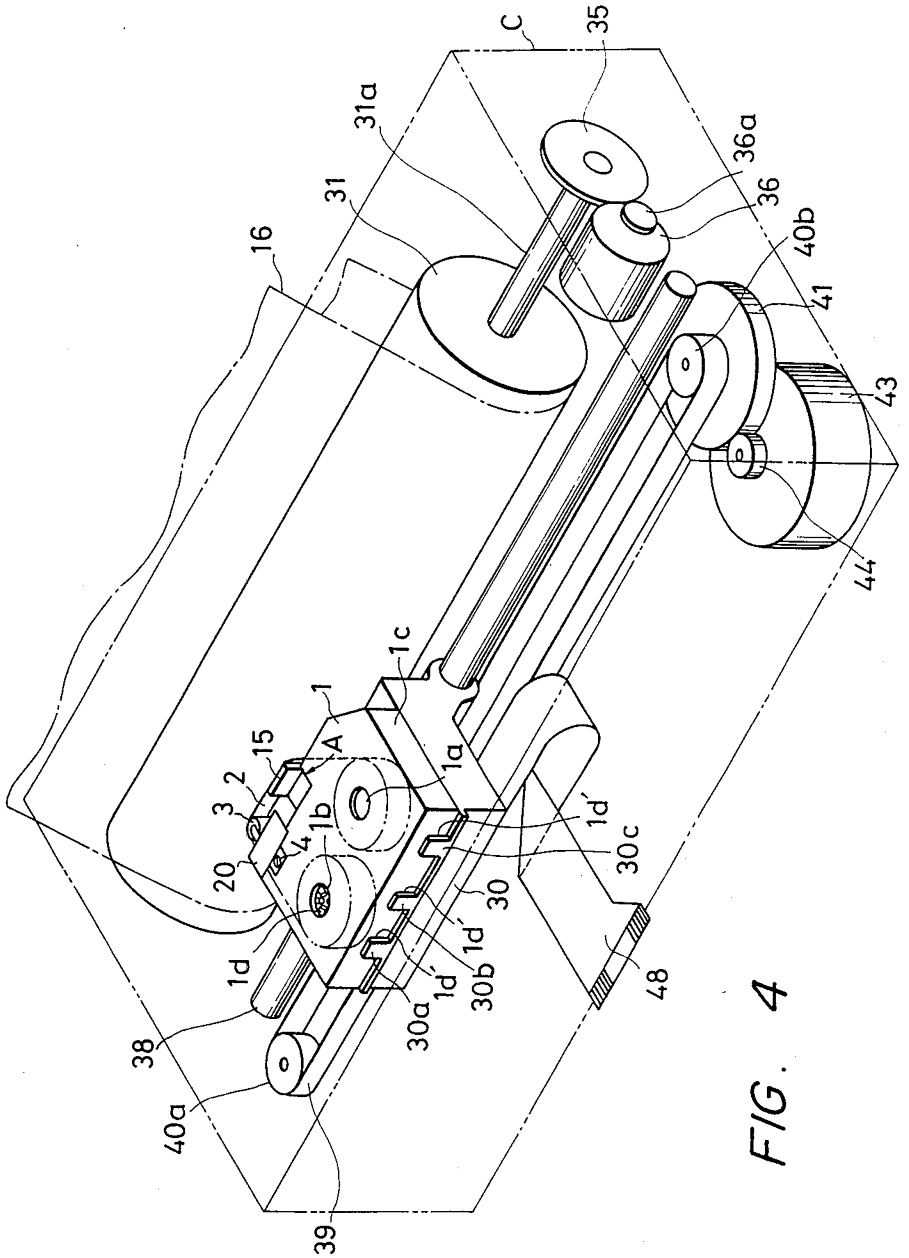
FIG. 4 is a perspective view of a thermal transfer type recording apparatus in which said ink ribbon cassette can be mounted.

Referring to FIG. 4, the thermal transfer printer C comprises a platen 31 in the form of a resilient cylinder which is made of a resilient material such as neoprene rubber and molded about a shaft 31a. The recording sheet 16 is wound about the platen 31 and fed as the platen 31 is rotated.

The shaft 31a includes a paper feed gear 35 at one end, which gear is engaged by a drive gear 36a on a paper feed pulse motor 36. As the paper feed pulse motor 36 is energized by any input pulses, the drive gear 36a is rotated to rotate the platen 31 in either of the opposite directions, so that the recording sheet 16 will be fed forwardly or rearwardly by a predetermined amount.

The carriage 30 is fitted over a shaft 38 such that the carriage 30 is slidable from the leftward direction to the rightward direction or vice versa as viewed in FIG. 4. The carriage 30 is connected to a timing belt 39 which is spanned between pulleys 40a and 40b. The pulley 40b is driven through a column feed gear 41 to move the timing belt 39.

A column feed gear 41 is engaged by a drive gear 44 on a column feed pulse motor 43. As the column feed pulse motor 43 is energized, the carriage 30 can be moved in either of the leftward and rightward directions as viewed in FIG. 4 through the timing belt 39.

As described hereinbefore, the carriage 30 removably supports the ink ribbon cassette 1 including the housing 1c within which the ink ribbon 2 comprising a substrate and a thermally transferable ink applied to the substrate and including a colorant dispersed in a hot-melt binder is wound about and spanned between the supply and wind-up reels 1a, 1b. The cassette 1 is mounted on the carriage 30 by engaging resilient latching elements 30a, 30b and 30c in recesses 1d' formed on the cassette housing 1c. When it is wanted to remove the cassette 1 from the carriage 30, the latching elements 30a, 30b and 30c may simply be removed from the respective recesses 1d' against the resiliency.

The carriage 30 includes the thermal head 15 for applying thermal energy to the ink ribbon 2 backwardly. Reference numeral 48 denotes a flexible printed board for transmitting print signals to the thermal head 15 in response to image information.

The printing operation will be described below.

When a print instruction is generated, the column feed pulse motor 43 is energized to initiate its rotation. The rotation of the motor 43 initiates the carriage 30 to move from its home position (leftward end position as viewed in FIG. 4) rightwardly. When print signals are inputted to the thermal head 15 through the flexible printed board 48, the heating elements (not shown) in the thermal head 15 are energized to fuse the thermally transferable ink on the ink ribbon 2. The fused ink is transferred from the ink ribbon 2 to the recording sheet 16 to form an image to be recorded.

Such a printing operation is repeated through an entire line. After this line has been printed, the rotation of the column feed pulse motor 43 is inverted to move the carriage 30 leftwardly as viewed in FIG. 4. At the same time, the paper feed pulse motor 36 is energized to rotate the platen 31. As a result, the recording sheet 16 will be moved upwardly as viewed in FIG. 4 by a predetermined amount.

In this connection, the ink ribbon 2 in the ribbon cassette 1 is adapted to move in the direction A when the carriage 30 is moved rightwardly as viewed in FIG. 4. Therefore, the thermal head 15 will always act on new unprinted parts of the ink ribbon 2. The used parts of the ink ribbon 2 will be retrieved in the ribbon cassette 1.

The winding force providing a tension on the ink ribbon 2 is given by a drive shaft 30a' on the carriage 30. The drive shaft 30a' is engaged by the gear 1d on the cassette 1 and rotated by the movement of the carriage 30, for example, through a gear train (not shown).

Thus, the conventional paper can be printed on by the thermal transfer printer of the above mentioned construction.

Reference will be made to another embodiment of the present invention in which the angle included between the ink ribbon and the recording sheet when the ink ribbon is separated from the recording sheet after being recorded on can be adjusted. In other words, said another embodiment provides a cassette which, depending on the property of the ink used, can properly adjust the time required to separate the ink ribbon from the recording sheet after being heated (hereinafter called "separation time") and the angle between the ink ribbon and the recording sheet when the ink ribbon is separated from the recording sheet (hereinafter called "separation angle"). As a result, the fused ink can more fully be transferred to the recording sheet.

Figure 5:
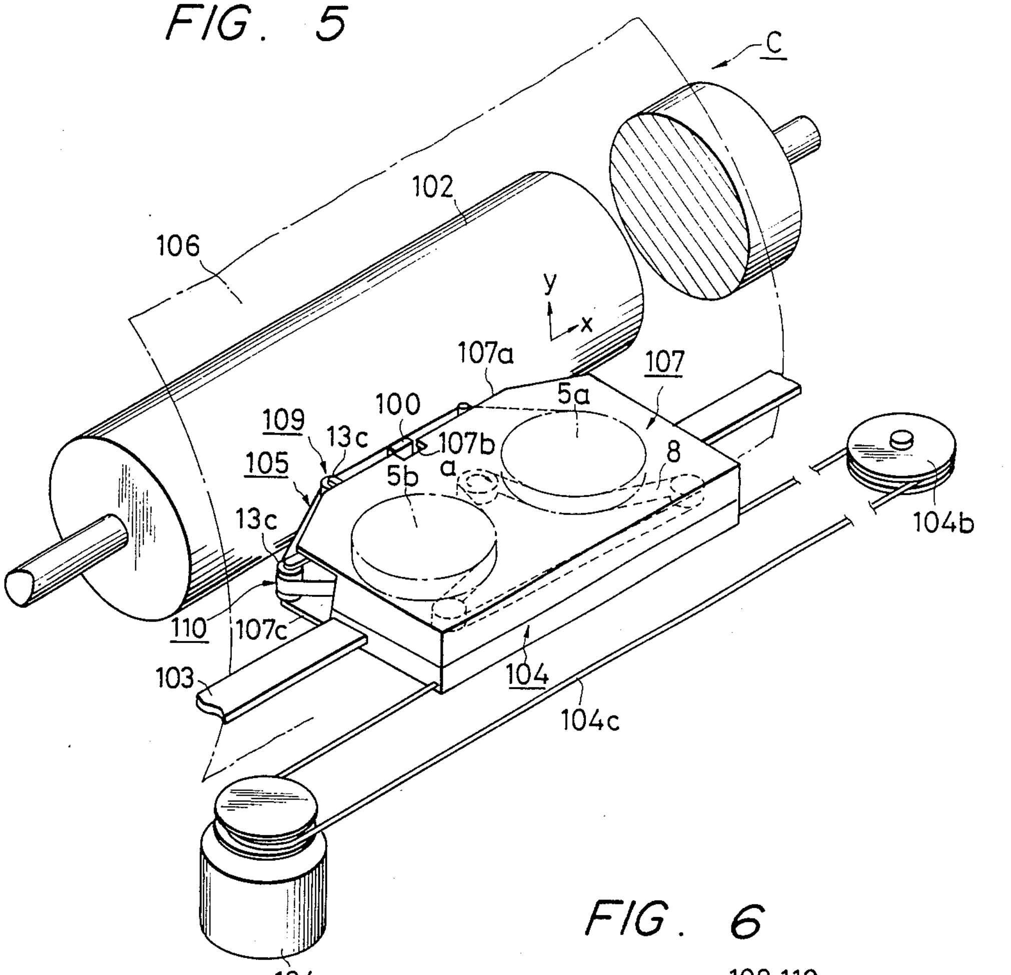
FIG. 5 is a fragmentary perspective view of a recording apparatus on which another embodiment of the cassette according to the present invention is mounted.

FIG. 5 illustrates a serial type thermal transfer printer C in which the cassette according to the present invention is mounted. The printer C comprises a recording head 100 adapted to heat in response to information of an image to be recorded. The recording head 100 is located faced to a platen roller 102 and mounted on a carriage 104 movable on a guide shaft 103 extending parallel to the longitudinal axis of the platen roller 102 in the direction of record x. The carriage 104 is rigidly mounted on a belt 104c spanned between a pulse motor 104a and a pulley 104b. When the pulse motor 104a is energized by given pulse signals, the carriage 104 is continuously or intermittently moved in the direction of record x.

In FIG. 5, reference numeral 105 denotes a thermal transfer medium interposed between the recording head 100 and a recording medium sheet 106. The thermal transfer medium comprises a sheet-like substrate and an ink film applied to the substrate, the ink film being of hot-melt, heat softening or heat sublimation property. The thermal transfer medium is charged in a cassette 107, which will be described, removably mounted on the carriage 104. The thermal transfer medium is adapted to run from a supply roll 105a to a wind-up roll 105b by engaging a rubber belt 108 which is driven by a motor (not shown) in a direction of arrow a at the same speed as that of the moving carriage 104.

The recording medium 106 is supported on the platen roller 102 and adapted to move on the peripheral face of the platen roller 102 in a direction y perpendicular to the direction of record x.

The cassette 107 includes a notch 107b formed thereon at one side shown by 107a and adapted to receive the recording head 100. The cassette 107 also includes a cut-out portion formed between the side 107a and another side 107c such that the thermal transfer medium 105 can exteriorily be exposed downstream of the direction of movement of the thermal transfer medium 105 relative to the notch 107b. The cut-out portion supports first and second guide members 109 and 110 for guiding the thermal transfer medium 105 during its movement.

Figure 6:
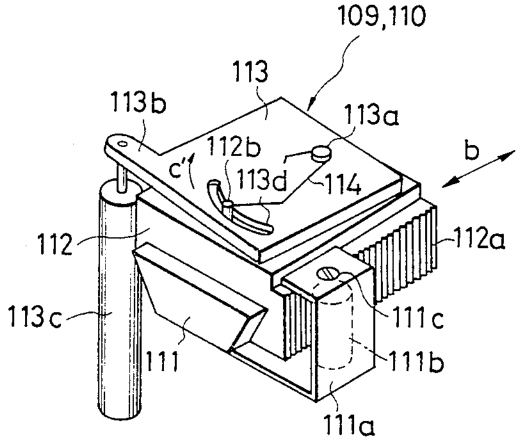
FIG. 6 illustrates the construction of a guide member.

As shown in FIG. 6, each of the guide members 109 and 110 comprises a stationary member 111 having a dovetail and a slidable member 112 having a dovetail groove. A dovetail joint between the dovetail and dovetail groove is such that the slidable member 112 can be connected with the stationary member 111 but moved relative to the stationary member 111. The stationary member 111 includes an arm 111a rigidly mounted thereon, the arm 111a supporting a pinion gear 111b which is engaged by a rack 112a formed on the slidable member 112 at its side face. A screw 111c is formed on the top of the pinion gear 11b and can be rotated as by a screwdriver such that the slidable member 112 can be moved in the direction of arrow b. A rotary plate 113 is rotatably mounted on the slidable member 112 through a shaft 113a and includes an arm 113b extending outwardly therefrom. A guide roller 113c is rotatably mounted on the arm 113b. A torsion spring 114 is fixed at one end to the rotary plate 113, the other end thereof being hooked on a projection 112b on the slidable member 112. Thus, the rotary plate 113 is biased in the direction of arrow C' under the action of the torsion spring 114. The rotary plate 113 also includes an arcuate slot 113d having its center coaxial to the axis of the shaft 113*a*. The projection 112 extends through the arcuate slot 113*d*.

Figure 7A:
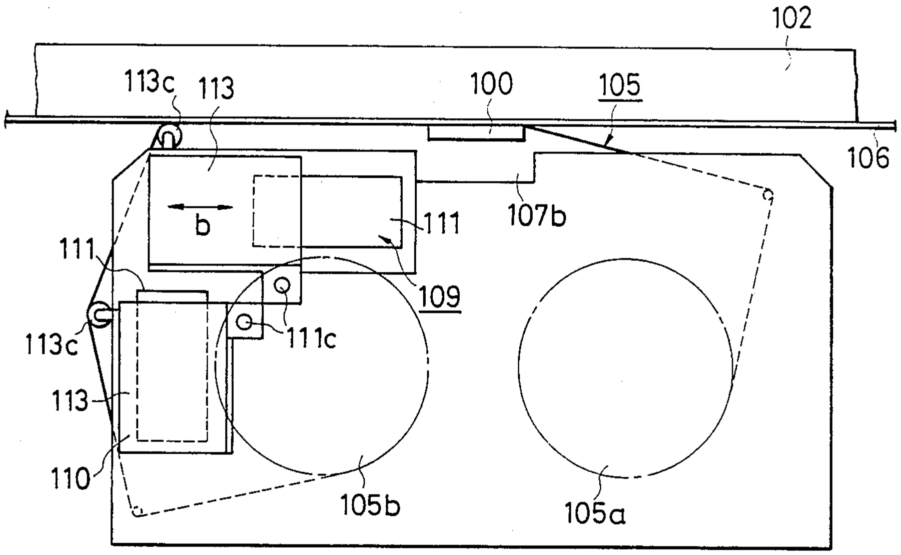
FIGS. 7A and 7B illustrate different uses of still another embodiment of the ink ribbon cassette according to the present invention.

As seen from FIG. 7A, when the carriage is moved together with the recording head 100 and the cassette 107 in the direction of record x, the thermal transfer medium 105 is unwound from the supply roll 105*a* with the unwound part thereof being wound around the wind-up roll 105*b* while being guided by the guide rollers 113*c* on the first and second guide members 109, 110. At the same time, the thermal transfer medium 105 is heated by the recording head 100 in response to image information to be recorded.

When heated, the ink on the thermal transfer medium 105 is fused into a pattern corresponding to the image to be recorded and then adheres to the recording medium 106. The adhering ink will be solidified to fully adhere to the recording medium 106 until it reaches the guide roller 113*c* on the first guide member 109. When the thermal transfer medium 105 is separated from the recording medium 106 under the action of the guide roller 113*c*, the adhering ink also is separated from the substrate to remain on the recording medium 106 as an image.

After the ink has been fused by the recording head 100, the fused ink is in intimate contact with the recording medium 106 between the recording head 100 and the guide roller 113*c* of the first guide member 109. This guide roller 113*c* can be shifted in the direction of arrow b by rotating the screw 111*c*. Therefore, the distance between the recording head 100 and the guide roller 113*c* can be changed. If this distance is reduced, the separation time is shortened. If on the contrary, the distance is increased, the separation time is increased. Thus, the separation time can easily be adjusted depending on the properties of the ink used.

Figure 7B:
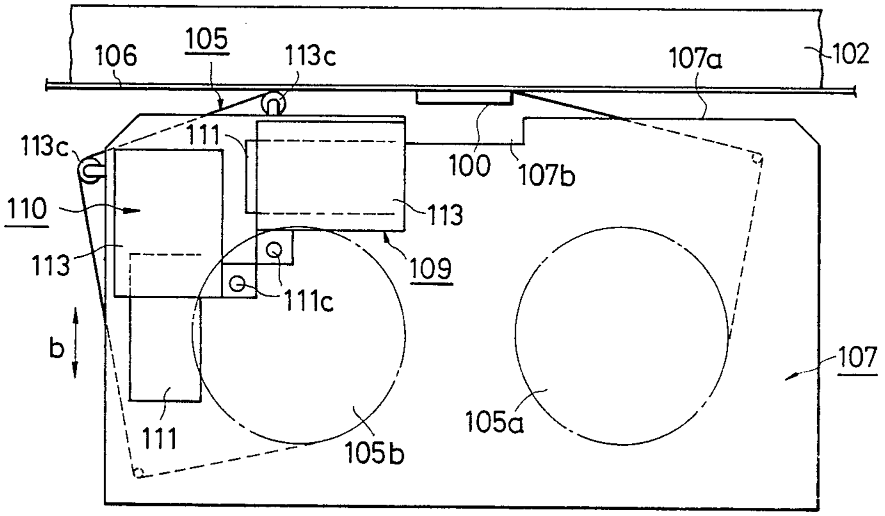

As shown in FIG. 7B, the guide roller 113*c* of the second guide member 110 can similarly be shifted in the direction of arrow b perpendicular to the direction in which the guide roller 113*c* of the first guide member 109 is shifted. This can suitably adjust the separation angle at which the thermal transfer medium 105 is separated from the recording medium 106 after recorded. The change of the separation angle causes a force required to separate the ink ribbon from the recording medium to change even if the winding force on the ink ribbon is unvaried.

It is to be understood that in this embodiment, the guide rollers 113*c* on the first and second guide members 109, 110 can be shifted to change the separation time and angle, respectively.

The diameters of the guide rollers 113*c* and the strength of the torsion spring 114 will not particularly be limited unless the guide rollers 113*c* can be in contact with the recording medium 106 through the thermal transfer medium 105. Where a recording medium 106 having a reduced smoothness of surface is used, however, it is preferred that the force of the torsion spring 114 on the first guide member 109 is increased to contact the guide roller 113*c* with the recording medium 106 through the thermal transfer medium 105 under an increased pressure.

Each of the guide rollers 113*c* may be replaced by any rod-like member.

Furthermore, the serial type printer may be replaced by a line type printer.

It is further of course that only one of the separation time and angle may be adjusted, if required.

Still another embodiment of the present invention will now be described. In this embodiment, an ink ribbon cassette is characterized by a projection formed therein for delaying the separation of the ink ribbon from the recording sheet, the projection being located on the side face of the cassette opposed to the recording sheet downstream of a printing head (relative to the direction of ribbon movement) when the cassette is mounted in the printer.

Figure 8:
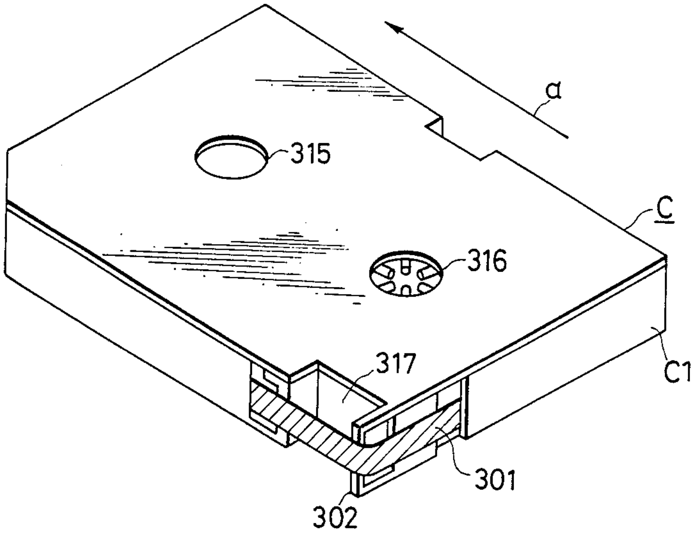
FIG. 8 is a perspective view of a further embodiment of the ink sheet cassette according to the present invention.

Referring to FIG. 8, there is shown an ink ribbon cassette C containing an ink ribbon 301 and including a stationary projection 302 for delaying the separation of the ink ribbon from a recording sheet 304. The projection 302 extends from a cassette housing C1 to substantially the same level as the recording position in a printing head 305 such that the projection 302 will be contacted by the recording sheet 304 through the ink ribbon 301 when the cassette C is mounted in the printer 303. Thus, the projection 302 can maintain the ink ribbon 301 at substantially the same level as the recording position at the printing head 305 after the ink ribbon 301 has been move past the recording position. The magnitude of the projection 302 will not particularly be limited unless it is in contact with the recording sheet 304 through the ink ribbon 301. The length of the projection 302 is preferably equal to or larger than the width of the ink ribbon 301. More concretely, desired printing is obtained when, for example, the amount of the projection extending outwardly from the cassette housing is equal to 2 millimeters, the print speed is at 18.38 cps and the separation time is equal to 45 meter-seconds.

Figure 9:
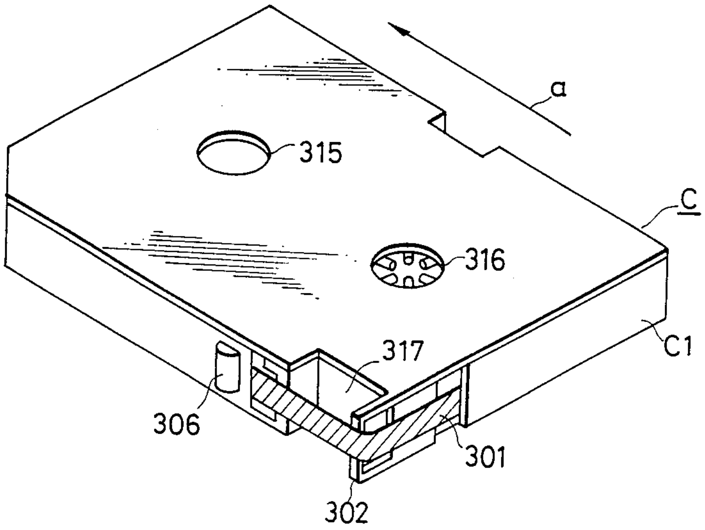
FIG. 9 is a perspective view of a further embodiment of the ink sheet cassette according to the present invention.

FIG. 9 shows a modified ink ribbon cassette C including another projection 306 which is formed on the cassette in front of the printing head 305, that is, at a location upstream in the print direction a and opposed to the recording sheet 304. The projection 306 functions to increase the smoothness in the surface of the recording sheet 304. The shape of the projection 306 is not limited to that shown in FIG. 9, but may take any suitable curved configuration unless the projection does not damage the surface of the recording sheet. The length of the projection 306 is preferably larger than the size of letters to be printed. The diameter of the projection 306 can be determined in the same manner as in the projection 302 for delaying the separation of the ink ribbon 301 from the recording sheet. The projection 306 is preferably positioned at a location as near the printing head 305 as possible.

Figure 10:
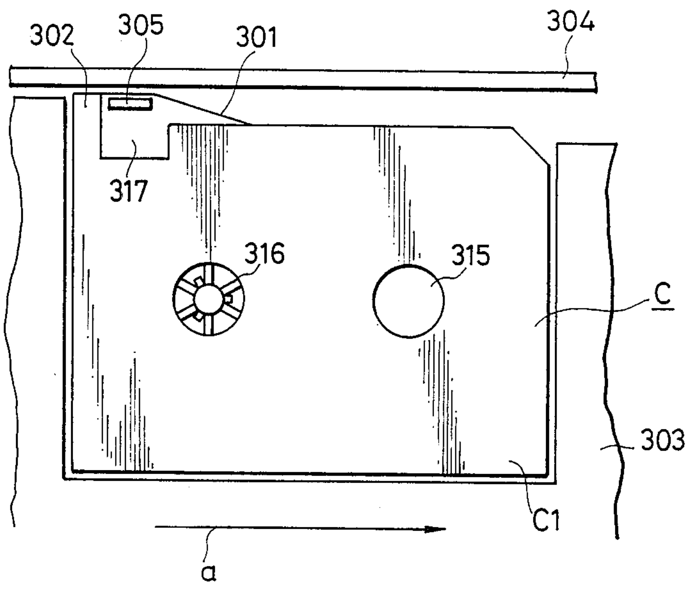
FIG. 10 is a plan view of the ink sheet cassette shown in FIG. 8.

In such an arrangement, the printing operation is carried out as the ink ribbon cassette C is moved in the direction of arrow a (print direction). At the same time, the ink ribbon 301 is moved rightwardly as viewed in FIG. 9. As seen from FIG. 10, the projection 302 can delay the separation of the ink ribbon 301 from the recording sheet 304 after printed. Thus, the ink fused by heat from the printing head 305 will more fully be transferred to the recording sheet before the fused ink is separated from the ink ribbon.

The modification of FIG. 9 also provides an improvement of printed letters since the projection 306 increases the smoothness of surface in the recording sheet immediately before the print is effected. Thus, the present invention enables the use of recording sheets having lower smoothness of surface.

Figure 11:
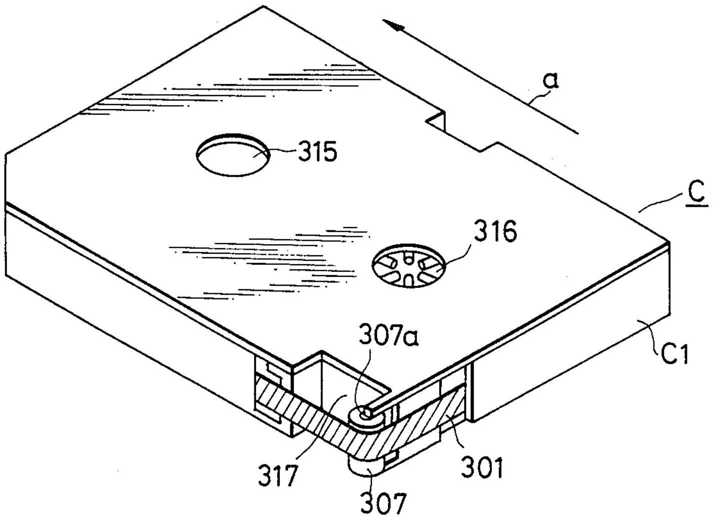
FIG. 11 is a perspective view of a further embodiment of the ink sheet cassette according to the present invention.

FIG. 11 shows another modification in which the projection 302 for delaying the separation time is replaced by a rotatable roller. Referring to FIG. 11, an ink ribbon cassette C containing an ink ribbon 301 includes a roller 307 rotatable about a shaft 307a. The roller 307 is located at a location spaced away from a cassette housing C1 to substantially the same position as the recording position in the printing head 305 such that the roller 307 can be contacted by the recording sheet 304 through the ink ribbon 301. As seen from FIG. 13, therefore, the roller 307 can maintain the ink ribbon 301 at substantially the same level as the recording position in the printing head after the ink ribbon 301 has been moved past the recording position.

Figure 12:
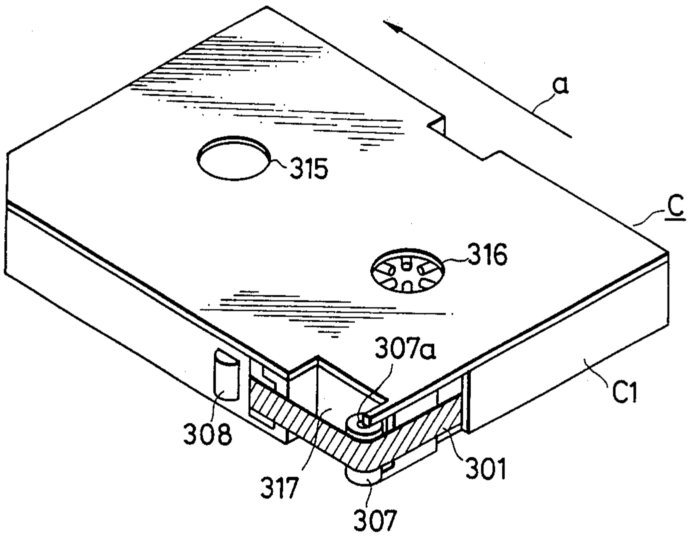
FIG. 12 is a perspective view of a further embodiment of the ink sheet cassette according to the present invention.

FIG. 12 shows a stationary projection 308 formed on the ink ribbon cassette C at a location upstream in the print direction a and opposed to the recording sheet such that the projection 308 can increase the smoothness of surface in the recording sheet. The shape of the projection 308 is not limited to the illustrated configuration, but may take any suitable curved configuration unless it does not damage the surface of the recording sheet. The length of the projection 308 is preferably larger than the size of letters to be printed. The diameter of the projection 308 can be determined in the same manner as in the roller 307. It is preferred that the projection 308 is positioned as near the printing head 305 as possible.

Figure 13:
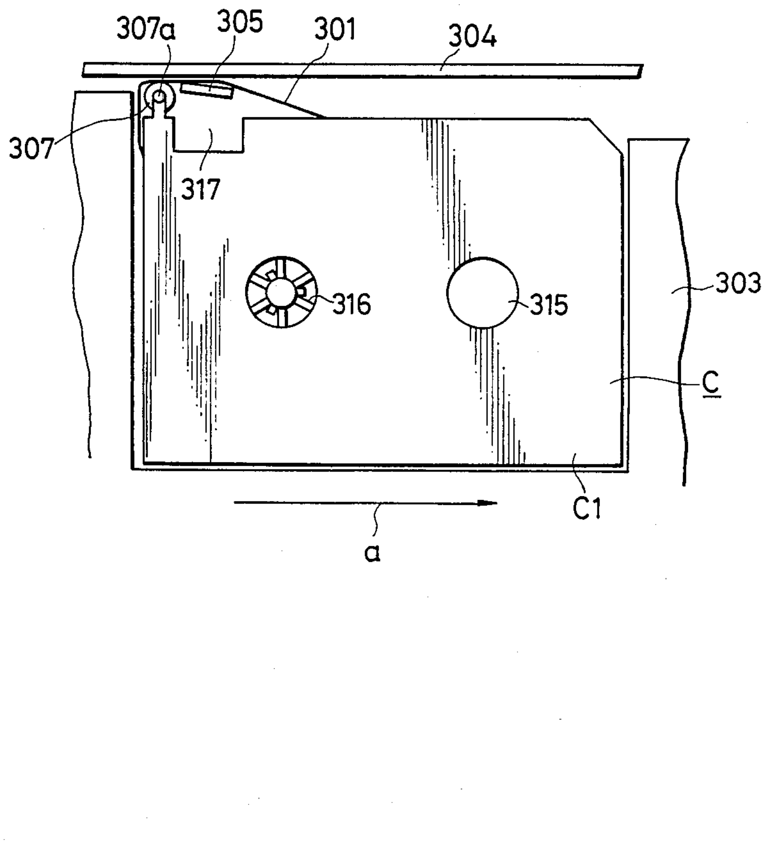
FIG. 13 is a plan view of the ink sheet cassette shown in FIG. 11.

As seen from FIG. 13, the roller 307 can delay the separation time at which the ink ribbon 301 is separated from the recording sheet 304 after printed. The ink fused by heat from the printing head can more fully be transferred to the recording sheet before the fused ink is separated from the ink ribbon. Thus, the transfer of ink to the recording sheet can be improved. Moreover, the roller 307 will decrease the load on the ink ribbon as the latter is moved in the inverse direction.

Figure 14:
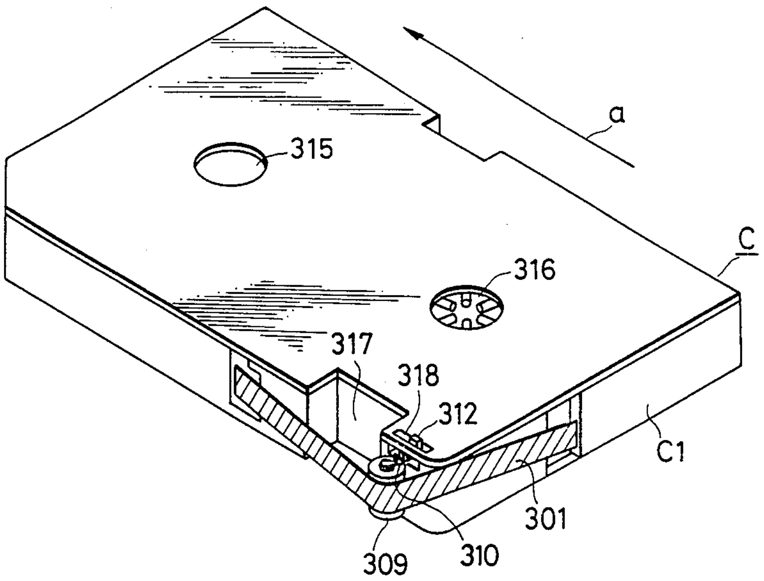
FIG. 14 is a perspective view of a further embodiment of the ink sheet cassette according to the present invention.

FIG. 14 shows an ink ribbon cassette C including a shiftable roller 309 which is adapted to contact the recording sheet through the ink ribbon 301. The roller 309 is movable in the direction of arrow a, but biased as by a spring 310 into contact with the recording sheet through the ink ribbon 301. The diameter of the roller 309 and the force of the spring 310 may optionally be set unless the roller 309 can be in contact with the recording sheet. The length of the roller 309 may be equal to or larger than the width of the ink ribbon.

Figure 15:
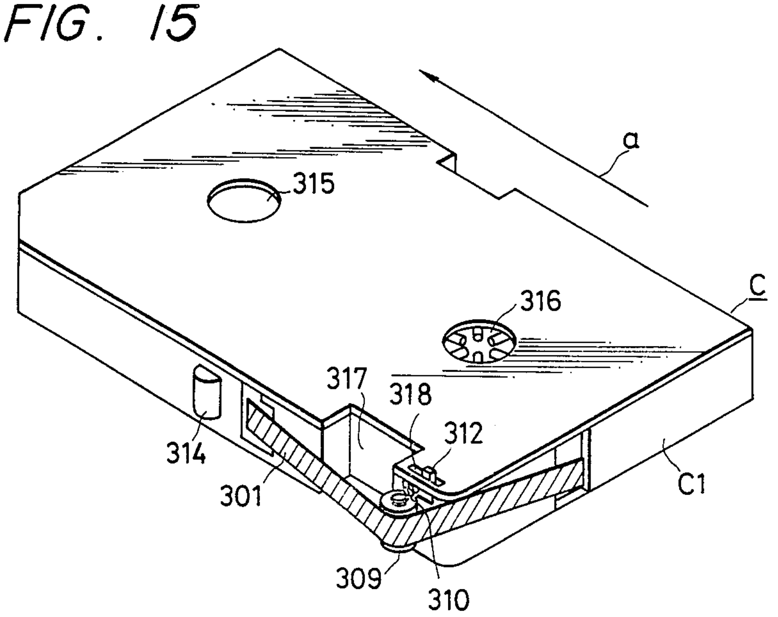
FIG. 15 is a perspective view of a further embodiment of the ink sheet cassette according to the present invention.

FIG. 15 shows such an ink ribbon cassette C including a stationary projection 314 for increasing the smoothness of surface in the recording sheet. The projection 314 is formed on the cassette at a location upstream in the print direction a and opposed to the recording sheet 304. Such a projection 314 is not limited to the illustrated configuration, but may take any suitable curved shape provided that it will not damage the surface of the recording sheet 304. The length of the projection 314 may be larger than the size of letters to be printed. The diameter of the projection 311 may be determined in the same manner as that of the roller 309. The position of the projection 314 is preferably as near the printing head 305 as possible.

The ink ribbon cassette C further includes a pawl 312 for shifting the roller 309 to change the separation time of the ink ribbon 301 from the recording sheet after being printed. The pawl 312 is mounted on one end of a spring 310 for holding the roller 309 and movably extends through a slot 318 formed on the cassette housing. The pawl 312 can be fastened at a suitable location relative to the slot 318 as by the use of screw means (not shown).

Figure 16A:
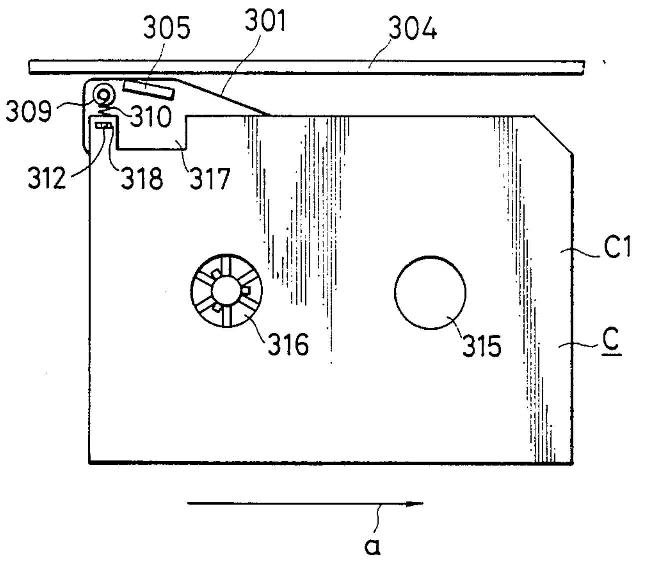
FIGS. 16A and 16B are plan views illustrating different operations of the ink sheet cassette shown in FIG. 14.
Figure 16B:
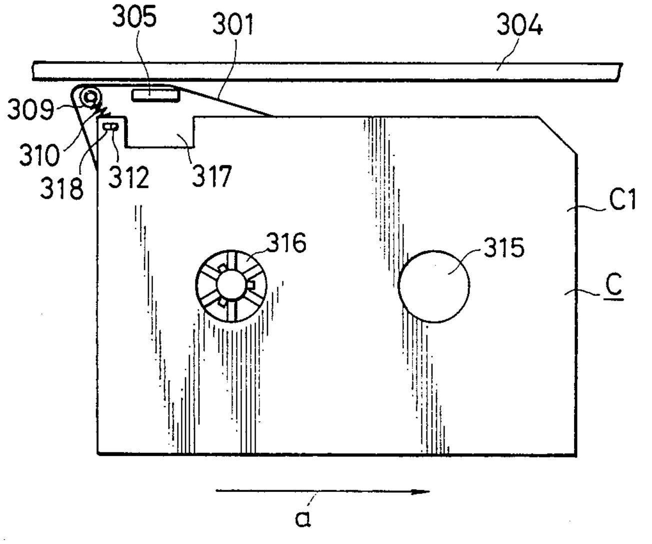

In such a manner, the proper position of separation can be determined depending on the aggregation of the ink used and/or the smoothness of the recording sheet used. For example, if an ink having an increased aggregation or a recording sheet having an increased smoothness is used, the roller 309 is shifted toward the printing head 305 to advance the separation, as shown in FIG. 16A. If an ink having a decreased aggregation or a recording sheet having a decreased smoothness is used, the roller 309 is shifted downstream away from the printing head 305 (relative to the direction of ribbon movement) to delay the separation, as shown in FIG. 16B. FIG. 16B illustrates the pawl 312 fastened as by the screw after it has been rotated slightly counterclockwise relative to the slot 318. In such a position, the spring 310 holding the roller 309 will be inclined relative to the cassette housing C1.

Figure 17:
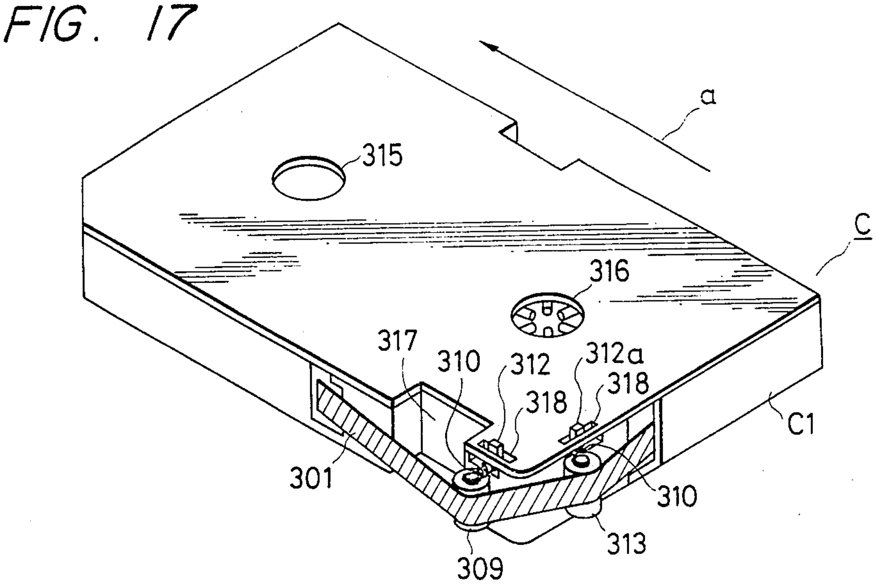
FIG. 17 is a perspective view of a further embodiment of the ink sheet cassette according to the present invention.

Referring next to FIG. 17, there is shown an ink ribbon cassette C including a second shiftable roller 313 formed thereon which is adapted to be positioned at a location rearward of the printing head and opposed to the recording sheet, in addition to the shiftable roller 309 operably interlocked to the pawl 312. The second shiftable roller 313 is operably interlocked to a pawl 312a and located nearer the printing head than the first roller 309 to support the ink ribbon 301. The first roller 309 is movable in the print direction a and biased by a spring 310 such that the roller 309 will always be in contact with the recording sheet through the ink ribbon 301. The second roller 313 is movable in the direction perpendicular to the print direction a and supports the ink ribbon 301 moving from the first roller 309 to form an angle between the ink ribbon 301 and the first roller 309. The diameters of the first and second rollers and the strength of the spring can suitably be selected. However, the length of the rollers is preferably equal to or larger than the width of the ink ribbon.

Figure 18:
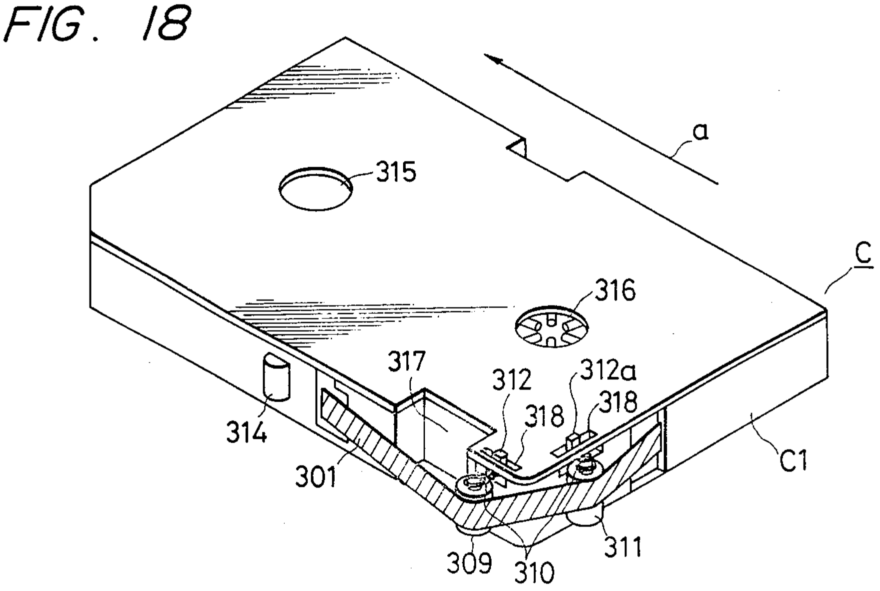
FIG. 18 is a perspective view of a further embodiment of the ink sheet cassette according to the present invention.

FIG. 18 shows an ink ribbon cassette C including a projection 314 for increasing the smoothness of surface in the recording sheet. The projection 314 is formed on the cassette C at a location downstream of the printing head and opposed to the recording sheet. The configuration of the projection 314 is not limited to the illustrated configuration, but may take any suitable curved configuration provided that it will not damage the surface of the recording sheet. The length of the projection is desired to be larger than the size of letters to be printed. The diameter of the projection 314 is not particularly limited. Preferably, the projection 314 is located as near the printing head as possible.

In such an arrangement, the first shiftable roller 309 can be moved by operating the pawl 312 to adjust the separation time while at the same time the second shiftable roller 311 can be moved by means of the pawl 312a to regulate the separation angle. Thus, an improved quality of print can always be obtained even though various inks having different properties and/or various recording sheets having different smoothnesses of surface are used for the same ink ribbon cassette. Furthermore, the quality of print can be improved by the use of the projection 314 for improving the smoothness of surface in the recording sheets. In this connection, reference numeral 315 denotes an unwinding shaft; 316 a winding shaft; and 317 a recess for receiving the printing head.

It is to be understood that the present invention may be applied to various other ink sheets which can fully perform their properties by changing the separation timing or condition, in addition to the aforementioned ink sheet. The recording medium may include OHP plastic sheets other than the conventional paper.

Thus, the present invention can provide an ink sheet cassette which can effect a recording operation suitable for the properties of an ink to be used or the properties of a recording medium to be used, and a recording apparatus utilizing such an ink sheet cassette.

I claim:

1. An ink sheet cassette mountable in an image recording apparatus for effecting image recording on a recording medium by using an ink sheet with ink, comprising:
- an ink sheet having ink;
- a first winding portion around which said ink sheet can be wound;
- a second winding portion around which said ink sheet can be wound;
- a drive force receiving portion for receiving a drive force for winding up around said second winding portion, said ink sheet wound around said first winding portion;
- a guide member capable of guiding the ink sheet moving from said first winding portion to said second winding portion;
- holding means for holding said guide member in a displaceable manner; and
- means for displacing said guide member held by said holding means.

2. An ink sheet cassette according to claim 1, wherein said ink is heat fusible.

3. An ink sheet cassette according to claim 1, wherein said ink sheet is formed by coating on a support member thermally transferable ink in which colorant is contained in a heat-fusible binder.

4. An ink sheet cassette according to claim 1, wherein said guide member delays a time of separating of said ink sheet.

5. An ink sheet cassette according to claim 1, wherein said guide member can adjust a time of separating of said ink sheet, after being heated, from said recording medium.

6. An ink sheet cassette according to claim 1, wherein said guide member changes a time of separating of said ink sheet, after being heated, from said recording medium.

7. An ink sheet cassette according to claim 1, wherein said guide member changes a time of separating of said ink sheet, after being heated, from said recording medium, by changing a position thereof.

8. An ink sheet cassette according to claim 1, further comprising means defining a recess in which a recording head of the image recording apparatus is located when said cassette is mounted on the image recording apparatus, wherein said guide member is disposed downstream of said recess with respect to the movement of said ink sheet.

9. An ink sheet cassette according to claim 1, further comprising a housing encasing said ink sheet, wherein said housing has inlet and outlet ports for exposing said encased ink sheet therebetween and thereafter leading the ink sheet to the inside of said housing, and said guide member is capable of contacting the ink sheet exposed between said inlet and outlet ports.

10. An ink sheet cassette according to claim 1, further comprising a housing encasing said ink sheet, wherein said guide member is disposed near a side of said housing.

11. An ink sheet cassette according to claim 1, further comprising a housing encasing said ink sheet, wherein said housing has inlet and outlet ports for exposing said enclosed ink sheet therebetween and thereafter leading the ink sheet to the inlet of said housing, and said guide member is disposed slightly upstream of said inlet port with respect to the movement of said ink sheet.

12. An ink sheet cassette according to claim 1, further comprising means defining a recess in which a recording head on said image recording apparatus is located when said cassette is mounted on the image recording apparatus, wherein said guide member is disposed apart from and independently of said recess.

13. An ink sheet cassette according to claim 1, wherein said guide member has a roller for causing the ink sheet, just after being heated by a recording head, slightly to contact or be pressed against said recording medium.

14. An ink sheet cassette according to claim 1, wherein said guide member has a roller for causing the ink sheet, just after being heated by a recording head, slightly to contact or to be pressed against said recording medium the same, and wherein said roller is rotatably provided on a shaft.

15. An ink sheet cassette according to claim 1, wherein said guide member is movable in a direction of movement of said ink sheet.

16. An ink sheet cassette according to claim 1, wherein said guide member is disposed at a corner of the ink sheet cassette.

17. An ink sheet cassette according to claim 1, wherein said guide member moves by rotation of a pinion gear.

18. An ink sheet cassette according to claim 1, wherein said member has a roller for causing the ink sheet, just after being heated by the recording head, slightly to contact or be pressed against said recording medium, said roller being longer than a width of said ink sheet.

19. An ink sheet cassette according to claim 1, wherein said guide member has a roller for causing the ink sheet, just after being heated by a recording head, slightly to contact or be pressed against said recording medium, said roller effecting the slight contact or pressing of the ink sheet against the recording medium by means of an urging force of a spring.

20. An ink sheet cassette according to claim 1, wherein said ink sheet is formed by coating on a sheet support heat fusible, heat softened or heat sublimated ink.

21. An ink sheet cassette according to claim 1, having a stationary projection for increasing the smoothness of the surface of the recording medium.

22. An ink sheet cassette according to claim 1, having adjusting means for adjusting an angle of the separation of the heated ink sheet from the recording medium.

23. An ink sheet cassette according to claim 1, wherein said guide member effects the image recording in correspondence with a property of said ink sheet by displacing said guide member.

24. An ink sheet cassette according to claim 1, wherein said guide member enables image recording even on a recording medium of low smoothness by displacing said guide member.

25. An ink sheet cassette according to claim 1, wherein said guide member is in contact with said ink sheet between said first and second winding portions.

26. An ink sheet cassette according to claim 1, wherein said means for displacing the guide member displaces said guide member in accordance with required conditions.

27. An image recording apparatus for effecting image recording on a recording medium by using an ink sheet with ink, comprising:

a mounting portion for mounting thereon an ink sheet cassette, said cassette having:
- an ink sheet,
- a first winding portion around which said ink sheet can be wound,
- a second winding portion around which said ink sheet can be wound,
- a drive force receiving portion for receiving a drive force for winding up around said second winding portion, said ink sheet wound around said first winding portion,
- a guide member capable of guiding said ink sheet moving from said first winding portion to said second winding portion,
- holding means for holding said guide member in a displaceable manner, and
- means for displacing said guide member held by said holding means;

recording means for acting on the ink sheet of the ink sheet cassette mounted on said mounting portion to effect the image recording on the recording medium;

drive means for transmitting a drive force to said drive force receiving portion of the ink sheet cassette mounted on said mounting portion; and conveying means for conveying the recording medium to a recording position of said recording means.

28. An image recording apparatus according to claim 27, wherein said ink is heat fusible.

29. An image recording apparatus according to claim 27, wherein said ink sheet is formed by coating on a support member thermally transferable ink in which colorant is contained in a heat-fusible binder.

30. An image recording apparatus according to claim 27, wherein said guide member delays a time of separating said ink sheet from said recording medium after being heated.

31. An image recording apparatus according to claim 27, wherein said guide member can adjust a time of separating of said ink sheet, after being heated, from said recording medium.

32. An image recording apparatus according to claim 27, wherein said guide member can change a time of separating of the ink sheet, after being heated, from said recording medium by changing a position thereof.

33. An image recording apparatus according to claim 27, wherein said guide member can change a time of separating of the ink sheet, after being heated, from said recording medium by changing a position thereof.

34. An image recording apparatus according to claim 27, further comprising a housing encasing said ink sheet, wherein said housing has inlet and outlet ports for exposing said encased ink sheet therebetween and thereafter leading the ink sheet to the inside of said housing, and wherein said guide member is capable of contacting the ink sheet exposed between said inlet and outlet ports.

35. An image recording appartus according to claim 27, further comprising a housing encasing said ink sheet, wherein said guide member is disposed near a side of said housing.

36. An image recording apparatus according to claim 27, further comprising a housing encasing said ink sheet, wherein said housing has inlet and outlet ports for exposing said enclosed ink sheet therebetween and thereafter leading the ink sheet to the inside of said housing, and wherein said guide member is disposed slightly upstream of said inlet port with respect to the movement of said ink sheet.

37. An image apparatus according to claim 27, wherein said guide member has a roller for causing the ink sheet, just after being heated by a recording head, slightly to contact or be pressed against said recording medium.

38. An image recording apparatus according to claim 27, wherein said guide member has roller for causing the ink sheet, just after being heated by a recording head, slightly to contact or be pressed against said recording medium, and wherein said roller is rotatably provided on a shaft.

39. An image recording apparatus according to claim 27, wherein said guide member is movable in a direction of the movement of said ink sheet.

40. An image recording apparatus according to claim 27, wherein said guide member is disposed at a corner of the ink sheet cassette.

41. An image recording apparatus according to claim 27, wherein said guide member moves by rotation of a pinion gear.

42. An image reocrding apparatus according to claim 27, wherein said guide member has a roller for causing the ink sheet, just after being heated by the recording heat, slightly to contact or be pressed against said recording medium, said roller being longer than a width of said ink sheet.

43. An image recording apparatus according to claim 27, wherein said guide member has a roller for causing the ink sheet, just after being heated by a recording head, slightly to contact or be pressed against said recording medium, said roller effecting the slight contact or the pressing of said ink sheet with the recording medium by means of an urging force of a spring.

44. An image recording apparatus according to claim 27, wherein said recording means is a thermal head having heating elements.

45. An image recording apparatus according to claim 27, wherein said recording means moves reciprocally in a direction of width of said recording medium.

46. An image recording apparatus according to claim 27, wherein said recording means is a thermal head and said guide member has a roller, and wherein said ink sheet moves in a predetermined direction while in contact with said recording medium other contact being maintained by means of a pressing force of said roller, even after the ink sheet has passed through an edge portion of said thermal head, and wherein said ink sheet is thereafter separated from said recording medium, after having passed through said roller.

47. An image recording apparatus according to claim 27, wherein said ink sheet is formed by coating on a sheet support heat fusible, heat softened or heat sublimated ink.

48. An image recording apparatus according to claim 27, having a stationary projection for increasing the smoothness of the surface of the recording medium.

49. An image recording apparatus according to claim 27, having adjusting means for adjusting an angle of the separation of the heated ink sheet from the recording medium.

50. An image recording apparatus according to claim 27, wherein said guide member effects the image recording in correspondence with a property of said ink sheet by displacing said guide member.

51. An image recording apparatus according to claim 27, wherein said guide member enables image recording even on a recording medium of low smoothness by displacing a guide member.

52. An image recording apparatus according to claim 27, wherein said guide member is in contact with said ink sheet between said first and second winding portions.

53. An image recording apparatus according to claim 27, wherein said means for displacing the guide member displaces said guide member in accordance with required conditions.

54. An ink sheet cassette removably mountable on a thermal recording apparatus for effecting image recording image recording on a recording medium by heating an ink sheet with ink by means of a thermal head to transfer the ink onto the recording medium, said cassette comprising:

- an ink sheet with thermally transferable ink;
- a housing encasing said ink sheet, said housing having an outlet port for exposing the encased ink sheet outside thereof and an inlet port for introducing the exposed ink sheet therethrough;
- a first winding portion around which said ink sheet can be wound;
- a second winding portion around which said ink sheet can be wound;
- a drive force receiving portion for receiving a drive force for winding up around said second winding portion said ink sheet wound around said first winding portion;
- a guide roller capable of guiding the ink sheet between said outlet port and said inlet port, which ink sheet runs from said first winding portion, said guide roller being disposed upstream of said inlet port with respect to the movement of said ink sheet;
- holding means for holding said guide roller in a displaceable manner; and
- means for displacing said guide roller held by said holding means.

55. An ink sheet cassette according to claim 54, wherein said thermally transferable ink is heat fusible, heat softening or heat sublimating ink.

56. An ink sheet cassette according to claim 54, wherein said guide roller is supported rotatably.

57. An ink sheet cassette according to claim 54, wherein said guide roller contacts a back face of said ink sheet through a resilient force.

58. An ink sheet cassette according to claim 54, wherein said guide roller changes a length of time between the heating of said ink sheet by said thermal head and the separation thereof from said recording medium.

59. An ink sheet cassette according to claim 54, wherein said guide roller can be displaced in accordance with required conditions.

60. A thermal recording apparatus for effecting iamge recording on a recording medium by heating an ink sheet with ink by means of a thermal head to transfer the ink onto the recording medium, comprising:

- a mounting portion for removably mounting an ink sheet cassette, said cassette having:
  - an ink sheet with thermally transferable ink,
  - a housing encasing said ink sheet, said housing having an outlet port for exposing the encased ink sheet outside thereof and an inlet port for introducing the exposed ink sheet therethrough,
  - a first winding portion around which said ink sheet can be wound,
  - a second winding portion around which said ink sheet can be wound,
  - a drive force receiving portion for receiving a drive force for winding up around said second winding portion, said ink sheet wound around said first winding portion,
  - a guide roller capable of guiding the ink sheet between said outlet port and said inlet port, which ink sheet runs from said first winding portion through said outlet and inlet ports to said second winding protion, said guide roller being disposed upstream of said inlet port with respect to the movement of said ink sheet,
  - holding means for holding said guide roller in a displaceable manner, and
  - means for displacing said guide roller held by said holding means;
- a thermal head having a heating portion, disposed to contact an exposed portion of the ink sheet outside from the ink sheet cassette, for effecting the image recording on said recording medium;
- drive means for transmitting a drive force to said drive force receiving portion of said ink sheet cassette mounted on said mounting portion; and
- conveying means for conveying the recording medium to a heating position of said thermal head.

61. A thermal recording apparatus according to claim 60, wherein said thermally transferable ink is heat fusible, heat softening or heat sublimating ink.

62. A thermal recording apparatus according to claim 60, wherein said guide roller is supported rotatably.

63. A thermal recording apparatus according to claim 60, wherein said guide roller contacts a back face of said ink sheet through a resilient force.

64. A thermal recording apparatus according to claim 60, wherein said guide roller changes a length of time between the heating of said ink sheet by a thermal head and the separation thereof from said recording medium.

65. A thermal recording apparatus according to claim 60, wherein said guide roller can be displaced in accordance with required conditions.

66. An ink sheet cassette mountable in an image recording apparatus for effecting image recording on a recording medium by using an ink sheet with ink, comprising:

- an ink sheeet having ink;
- a first winding portion around which said ink sheet can be wound;
- a second winding portion around which said ink sheet can be wound;
- a drive force receiving portion for receiving a drive force for winding up around said second winding portion said ink sheet wound around said first winding portion;
- a guide member capable of guiding the ink sheet moving from said first winding portion to said second winding portion;
- holding means for holding said guide member displaceably in a direction of the movement of the ink sheet from said first winding portion to said second winding portion; and means for dispalcing said guide member held by said holding means in said direction of the movement of the ink sheet.

67. An ink sheet cassette removably mountable on a thermal recording apparatus for effecting image recording on a recording medium by heating an ink sheet with ink by a thermal head to transfer said ink onto said recording medium, said cassette comprising:

an ink sheet having thermally transferable ink;

a housing having a recess in which the thermal head of the thermal recording apparatus is located when said housing is mounted on the thermal recording apparatus;

a first winding poriton around which said ink sheet can be wound;

a second winding portion around which said ink sheet can be wound;

a drive force receiving portion for receiving a drive force for winding said ink sheet wound around said first winding portion, up around said second winding portion;

a defining member for defining a conveyance path of said ink sheet, said defining member projecting from said homing, to and beyond a position where the ink sheet runs across said recess from said first winding portion to said second winding portion;

holding means for holding the defining member in a displaceable manner; and means for displacing said defining member held by said holding means.

* * * * *

UNITED STATES PATENT AND TRADEMARK OFFICE

CERTIFICATE OF CORRECTION

PATENT NO. : 4,750,007

DATED : June 7, 1988

INVENTOR(S) : TAKAYUKI SUZUKI

It is certified that error appears in the above-identified patent and that said Letters Patent is hereby corrected as shown below:

AT [57] IN THE ABSTRACT

Insert final paragraph of Abstract:

--The present invention also provides an image recording apparatus including a portion for receiving the ink sheet cassette.--.

COLUMN 3

Line 67, "an" should read --a--.

COLUMN 4

Line 21, "outlet 1a" should read --outlet 1a'--.

COLUMN 5

Line 18, "rotaty" should read --rotary--.
Line 27, "rotaty" should read --rotary--.
Line 28, "direction C" should read --direction C'--.
Line 53, "date." should read --data.--.

COLUMN 6

Line 12, "moved" should read --being moved--.
Line 17, "fully" should read --full--.
Line 31, "farther the" should read --farther from the--.
Line 32, "can" should read --to--.

UNITED STATES PATENT AND TRADEMARK OFFICE

CERTIFICATE OF CORRECTION

PATENT NO. : 4,750,007

DATED : June 7, 1988

INVENTOR(S) : TAKAYUKI SUZUKI

It is certified that error appears in the above-identified patent and that said Letters Patent is hereby corrected as shown below:

COLUMN 7

Line 61, "an-" should be deleted.

COLUMN 8

Line 56, "pinion gear 11b" should read --pinion gear 111b--.
Line 66, "arrow C'" should read --arrow c'--.

COLUMN 9

Line 42, "recorded." should read --recording.--.
Line 67, "further" should read --further true--.

COLUMN 10

Line 22, "move" should read --moved--.
Line 40, "unless" should read --provided that--.
Line 55, "printed." should read --printing.--.

COLUMN 11

Line 18, "unless" should read --provided that--.
Line 27, "printed." should read --printing.--.
Line 54, "projection 311" should read --projection 314--.

COLUMN 14

Line 23, "the same" should be deleted.
Line 35, "said member" should read --said guide member--.

UNITED STATES PATENT AND TRADEMARK OFFICE

CERTIFICATE OF CORRECTION

PATENT NO. : 4,750,007

DATED : June 7, 1988

INVENTOR(S) : TAKAYUKI SUZUKI

It is certified that error appears in the above-identified patent and that said Letters Patent is hereby corrected as shown below:

COLUMN 15

Line 54, "by changing a position thereof" should be deleted.
Line 67, "appartus" should read --apparatus--.

COLUMN 16

Line 11, "image apparatus" should read --image recording apparatus--.
Line 17, "roller" should read --a roller--.
Line 31, "reocrding" should read --recording--.
Line 34, "heat," should read --head,--.

COLUMN 17

Line 21, "image recording" should be deleted.
Line 64, "iamge" should read --image--.

COLUMN 18

Line 18, "protion," should read --portion,--.

COLUMN 19

Line 1, "dispalcing" should read --displacing--.
Line 15, "poriton" should read --portion--.

UNITED STATES PATENT AND TRADEMARK OFFICE
CERTIFICATE OF CORRECTION

PATENT NO. : 4,750,007

DATED : June 7, 1988

INVENTOR(S) : TAKAYUKI SUZUKI

It is certified that error appears in the above-identified patent and that said Letters Patent is hereby corrected as shown below:

COLUMN 20

Line 9, "homing," should read --housing,--.

Signed and Sealed this

Twenty-eighth Day of February, 1989

Attest:

DONALD J. QUIGG

Attesting Officer

*Commissioner of Patents and Trademarks*